UNITED STATES PATENT OFFICE.

MONE R. ISAACS, OF PHILADELPHIA, PENNSYLVANIA.

COATING COMPOSITION.

1,063,974. Specification of Letters Patent. Patented June 10, 1913.

No Drawing. Application filed May 14, 1912. Serial No. 697,256.

*To all whom it may concern:*

Be it known that I, MONE R. ISAACS, a citizen of the United States, residing at Philadelphia, in the county of Philadelphia and State of Pennsylvania, have invented certain new and useful Improvements in Coating Compositions, of which the following is a specification.

This invention relates to coating compositions for wood surfaces and particularly for the interior surfaces of wooden barrels which are to contain oils and similar substances.

Heretofore, an aqueous solution of glue has been commonly used to coat the interior surfaces of barrels and the results attained have in many instances proved unsatisfactory. Attempts have been heretofore made to use casein solutions, but such attempts have been unsuccessful because the coating produced was too brittle to last and was more or less permeable.

The object of my invention is to provide a novel casein coating composition which may be applied to surfaces and particularly to the interior surfaces of barrels and which when applied will be very searching in penetrating all pores, openings, holes and crevices in the wooden barrel staves and in the joints between the staves and other parts, and which when applied will form a coating having the desired flexibility and which will be more impervious than heretofore.

A further object of my invention is to provide a novel method of treating wood surfaces with my improved coating composition; all as will be hereinafter fully described and claimed.

In carrying out my process, I prepare a casein solution from water, casein, a salt of a sulfonic acid of an aromatic hydrocarbon, and a substance suitable for rendering casein soluble when used in conjunction with water or several such substances. Under the latter head come the alkalis, alkaline carbonates and certain salts of ammonium, and of the alkaline metals as borax and tri-sodium phosphate. All these substances which render casein soluble in water or any mixture of two or more of them, I shall hereafter include for brevity under the name of alkali and wherever the word hereafter occurs in these specifications and claims, it is to be understood in this sense. Preferably I take casein, borax, sodium naphthalene alpha sulfonate and water, though I do not desire to be understood to limit myself to this special instance of the composition above described, nor to limit myself to the following proportion which I give as an example: casein 100, borax 15, sodium naphthalene alpha sulfonate 50, water 400. This mixture or another one of the type, is heated to about 160 degrees or until the composition has dissolved; it is then poured hot in the bung hole of the barrel and brought into contact with the various parts of the interior surface of the latter by moving about in the usual way, and afterward the excess is allowed to drain out. When an extra thick coating is required, another or several more applications of the coating may be made, in the same manner.

Having thus described my invention, what I claim as new and desire to secure by Letters Patent is:

1. A coating composition consisting of casein, an alkali, a salt of a sulfonic acid of an aromatic hydrocarbon and water.

2. A coating composition consisting of casein, an alkali, sodium naphthalene sulfonate and water.

In testimony whereof I affix my signature in presence of two witnesses.

MONE R. ISAACS.

Witnesses:
S. I. HARPER,
A. V. GROUPE.